United States Patent Office 3,790,642
Patented Feb. 5, 1974

---

3,790,642
SELECTIVE DISPROPORTIONATION OF CRESOLS
Naoya Kominami, Tokyo, Nobuhiro Tamura, Oi, and Hiroshi Mikami and Etsuo Yamamoto, Tokyo, Japan, assignors to Asahi Kasei Kogyo Kabushiki Kaisha, Osaka, Japan
No Drawing. Filed June 8, 1971, Ser. No. 150,915
Claims priority, application Japan, June 12, 1970, 45/50,261
Int. Cl. C07c 37/00, 37/12
U.S. Cl. 260—621 D    4 Claims

ABSTRACT OF THE DISCLOSURE

An improved process for the preparation of phenol and xylenols from cresols by a disproportionation reaction characterized in that the disproportionation reaction is effected with heating in the presence of an alumina catalyst having ammonium thiocyanate incorporated therein or an alumina catalyst having ammonium thiocyanate together with at least one of metals Co, Ni, Pd and Rh incorporated therein. This process can selectively provide as a main product a xylenol having a methyl group at the ortho position, which is useful as a raw material for the production of industrial chemicals.

---

This invention relates to a selective disproportionation of cresols.

More particularly, this invention relates to an improved process for the preparation of phenol and xylenols by the disproportionation of cresols wherein such xylenols having a methyl group at the ortho position can be selectively formed as the desired xylenol.

Still more particularly, this invention is concerned with an improved process for the preparation of phenol and xylenols by a selective disproportionation of cresols characterized in that the disproportionation reaction is conducted, with heating, in the presence of an alumina catalyst having ammonium thiocyanate incorporated therein or an alumina catalyst having ammonium thiocyanate together with at least one of the metals Co, Ni, Pd and Rh incorporated therein.

Heretofore there has been suggested a process for the disproportionation of cresols wherein a gas phase reaction is carried out at an elevated temperature in the presence of a solid acid catalyst, e.g., aluminum fluoride, hydrogen fluoride-treated alumina, silica-alumina or the like (see, for example, U.S. Pat. Nos. 2,551,628 and 2,678,337 and British Pat. No. 695,464).

These prior processes, however, are not commercially desirable from the economic point of view since the isomerization could occur simultaneously with the disproportionation of cresols and various types of xylenol isomers would be simultaneously formed, thereby requiring a complicated procedure for separation when the production of a specific type of xylenol is desired.

Of the various types of xylenol isomers, 2,6-xylenol has recently attracted public attention as an important raw material for industrial use, and there has been proposed a process for the preparation of 2,6-xylenol from phenol and methanol (see, for example, Japanese patent publication No. 6,894/1957). This process has, however, a serious disadvantage from the economical point of view since a highly expensive reactant, methanol, is employed as a source of the methyl group.

Now, as a result of our extensive studies for a process for the disproportionation of cresols which can selectively produce a xylenol having a methyl group at the ortho-position, it has been found that the selective introduction of a methyl group in the ortho position relative to a hydroxyl group in the xylenol structure can be accomplished by conducting the disproportionation of cresols in the presence of a catalyst comprising alumina having ammonium thiocyanate incorporated therein. Further, it has also been found that the above-mentioned introduction of a methyl group in the ortho position can be smoothly accomplished at a relatively lower temperature by conducting the above-mentioned disproportionation in the presence of a catalyst comprising alumina having ammonium thiocyanate together with at least one of the metals cobalt, nickel, palladium and rhodium incorporated therein. This invention has been made on the basis of such novel findings.

It is, accordingly, a primary object of this invention to provide an improved and advantageous process for the preparation of a specific type of xylenol by the disproportionation of cresols.

Other objects and advantages of this invention will be apparent to those skilled in the art from the following description and claims.

In one embodiment of this invention, the process of this invention is conducted by subjecting the starting cresols to disproportionation in the presence of an alumina catalyst having ammonium thiocyanate incorporated therein.

In another embodiment of this invention, the process of this invention is conducted by subjecting the starting cresols to disproportionation in the presence of an alumina catalyst having ammonium thiocyanate together with one or more metals cobalt, nickel, palladium and rhodium incorporated therein.

The process according to the present invention can be favorably effected under such an atmosphere as hydrogen, nitrogen, carbon monoxide or carbon dioxide gas, or steam. Hydrogen gas is particularly advantageous since the formation of carbonaceous deposits over the catalyst is prevented.

The reaction temperature in both embodiments is not critical, but it is preferable to employ a temperature of about 250 to 500° C. In this connection, as stated hereinbefore, it is noted that in the latter embodiment, the reaction can smoothly proceed at a relatively low temperature e.g. about 250 to 350° C.

The reaction pressure in both embodiments is also not critical and the reaction may be effected under atmospheric pressure or super-atmospheric pressure.

These embodiments may be advantageously effected in any fashion, for instance, in a fixed bed, fluidized bed or moving bed system.

The starting cresol which is employed in the process of this invention may be any o-cresol, m-cresol or p-cresol, and as main products obtained phenol and 2,6-xylenol when o-cresol is employed, phenol and 2,5-xylenol when m-cresol is employed and phenol and 2,4-xylenol when p-cresol is employed, respectively. The starting cresol may be introduced into a catalyst layer either as such or, if desired, in a form of the solution thereof in a suitable solvent, e.g., benzene, toluene, n-paraffin or the like.

The catalysts which are employed in the process of this invention and constitute an essential feature of this invention include an alumina catalyst having ammonium thiocyanate incorporated therein and an alumina catalyst having ammonium thiocyanate together with one or more metals Co, Ni, Pd and Rh incorporated therein. These catalysts may be readily prepared by a conventional means commonly utilized in the art for the preparation of such catalysts, for example, by impregnation, mixing or co-precipitation to have ammonium thiocyanate produced or carried by alumina; by having a suitable salt of a metal cobalt, nickel, palladium or rhodium, e.g., the chloride, nitrate or acetate and ammonium thiocyanate produced or carried by alumina simultaneously or successively and then subjecting the resulting material to reduction; or by first having the above-mentioned salt boron or carried by alumina, subjecting the resultant to reduction and then impregnating the thus reduced product with ammonium thiocyanate. In the catalyst utilized in the process of this invention, the amount of ammonium thiocyanate to be incorporated therein may be usually selected within the range of 1.0 to 2.0% by weight based upon the alumina carrier. The weight ratio of ammonium thiocyanate to a metal cobalt, nickel, palladium or rhodium may hours after the starting of the reaction, the perpass yields obtained on the o-cresol feed were 4.7% for phenol, of 0.6% for p-cresol, of 2.1% for 2,6-xylenol, of 2.5% for 2,4-xylenol and of 0.2% for 2,4,6-trimethylphenol.

EXAMPLES 2 TO 9 AND COMPARATIVE EXAMPLES 2 AND 3

The same procedure and apparatus as in the above Example 1 were employed by parying the catalyst and reaction condition as indicated below.

The results are summarized in the following Table 1.

TABLE 1

| Ex. No. | Catalyst (amount employed) | Reaction condition ||| Volume ratio | Yield of product (5 hours after the starting of the reaction), percent |||||||
|---|---|---|---|---|---|---|---|---|---|---|---|---|
| | | Temp. (° C.) | Starting material | Solvent | | Phenol | Xylenol at— ||||||
| | | | | | | | 2,6- | 2,5- | 2,4- | 2,3- | 3,4- | 3,5- |
| 2 | Rh-NH$_4$SCN-Al$_2$O$_3$ (0.02 g./0.2 g./10 cc.) | 300 | o-Cresol | Benzene | 0.3 | 8.6 | 7.3 | | 1.2 | | | |
| 3 | Ni-NH$_4$SCN-Al$_2$O$_3$ (0.1 g./0.5 g./10 cc.) | 320 | do | do | 0.5 | 13.6 | 11.5 | | 2.0 | | | |
| 4 | Ni-Co-NH$_4$SCN-Al$_2$O$_3$ (0.1 g./0.1 g./0.3 g./10 cc.) | 300 | p-Cresol | n-Heptane | 1 | 6.4 | | | 5.9 | | 0.2 | |
| 5 | Pd-NH$_4$SCN-Al$_2$O$_3$ (0.1 g./0.5 g./10 cc.) | 300 | m-Cresol | do | 1 | 4.6 | | 4.3 | | 0.1 | 0.1 | |
| 6 | Ni-NH$_4$SCN-Al$_2$O$_3$ (0.1 g./0.2 g./10 cc.) | 330 | o-Cresol | Benzene | 0.1 | 16.6 | 13.6 | | 2.8 | | | |
| 7 | Ni-NH$_4$SCN-Al$_2$O$_3$ (0.1 g./0.2 g./10 cc.) | 280 | p-Cresol | Toluene | 0.2 | 2.5 | | | 2.5 | | | |
| 8 | Ni-NH$_4$SCN-Al$_2$O$_3$ (0.1 g./0.2 g./10 cc.) | 300 | o-Cresol | n-Hexane | 1 | 10.4 | 9.0 | | 1.3 | | | |
| 9 | Co-NH$_4$SCN-Al$_2$O$_3$ (0.1 g./0.5 g./20 cc.) | 350 | do | Benzene | 1 | 21.6 | 16.8 | | 4.7 | | | |
| Comparative Ex. 2 | Rh-Al$_2$O$_3$ (0.02 g./10 cc.) | 300 | do | do | 0.3 | 8.0 | 5.2 | | 2.6 | | | |
| Comparative Ex. 3 | Pd-Al$_2$O$_3$ (0.1 g./10 cc.) | 300 | m-Cresol | n-Heptane | 1 | 4.2 | | | | 1.0 | 0.4 | 0.2 |

NOTE:
1. The yield is expressed in terms of a perpass yield based upon the cresol fed.
2. Feeding rate of each material was 600 hr.⁻¹ (G.H.S.V.) for hydrogen gas and 0.5 hr.⁻¹ (L.H.S.V.) for liquid material.
3. Comparative Ex. 2 corresponds to Ex. 2 and Comparative Ex. 3 to Ex. 5.
4. The catalyst employed in Ex. 5 was the one prepared by reducing the alumina having been impregnated with a palladium salt with hydrazine followed by incorporating thereinto ammonium thiocyanate.
5. The catalysts employed in the other examples were prepared by impregnating an alumina with an aqueous solution of the chloride of Rh, Ni or Co and ammonium thiocyanate and subsequently evaporating to dryness, followed by reduction employing hydrogen gas at the reaction temperature before use.

usually be 0.1 to 10:1 and preferably 0.2 to 5:1. The amount of the catalyst to be employed in the process of factors but may generally be preferably in the range of 0.1 to 10.0 hr.⁻¹ in terms of L.H.S.V. The exhausted catalyst, the catalytic activity of which was lowered after the use in the process of this invention, can be readily regenerated through the treatment with air.

This invention will be further illustrated by the following non-limitative examples.

EXAMPLE 1

To an aqueous solution prepared by dissolving 0.5 g. of ammonium thiocyanate in 20 cc. of water were added 10 cc. of alumina having a particle diameter of 2 mm. and the resulting mixture was evaporated to dryness. The catalyst (10 cc.) thus prepared was charged into a straight hard glass reaction tube having an inner diameter of 12 mm. The reaction tube was heated to 350° C. in an electric oven. Then a solution of 30 g. of o-cresol in 50 cc. of benzene was fed into the reaction tube at a feeding rate of 15 cc./hour by means of a micro pump while a hydrogen gas was introduced therein at a feeding rate of 100° cc./minute. Analysis of the reaction mixture in a trap, 3 hours after the starting of the reaction, showed that the perpass yields on the o-cresol feed were obtained of 5.1% for phenol, of 4.0% for 2,6-xylenol and of 0.6% for 2,4-xylnol.

COMPARATIVE EXAMPLE 1

The same procedure and apparatus as in the above Examle 1 were employed except that an alumina catalyst containing no ammonium thiocyanate was employed. 3

What is claimed is:

1. A process for the preparation of phenol and xylenols from cresols by a disproportionation reaction, the improvement comprising heating said cresol in an alumina catalyst, said alumina catalyst having incorporated therein 1.0 to 2.0% by weight based on the weight of alumina catalyst of ammonium thiocyanate, at a temperature range of about 250° C. to 500° C. to obtain a xylenol having a methyl group at the ortho position.

2. A process according to claim 1 wherein said alumina catalyst also contains a metal selected from the group consisting of cobalt, nickel, palladium and rhodium and the weight ratio of said ammonium thiocyanate to said metal is 0.1 to 10:1.

3. A process according to claim 2 wherein said weight ratio of ammonium thiocyanate to said metal is 0.2 to 5:1.

4. A process according to claim 1 wherein the temperature ranges from 250° C. to 350° C.

References Cited
UNITED STATES PATENTS 2,777,881   1/1957   Neworth _____ 260—621 E
3,417,149   12/1968  Neuworth et al. _____ 260—621 D
3,518,317   6/1970   Shooter et al. _____ 260—621 D BERNARD HELFIN, Primary Examiner N. MORGENSTERN, Assistant Examiner U.S. Cl. X.R.

252—438; 260—621 E